(12) United States Patent
Knittel et al.

(10) Patent No.: US 9,565,517 B2
(45) Date of Patent: Feb. 7, 2017

(54) METHOD FOR INFORMING ON THE PRESENCE OF A REMOTE DEVICE'S HOLDER

(75) Inventors: Frederic Knittel, Meudon (FR); Denis L'Heriteau, Meudon (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 13/990,453

(22) PCT Filed: Nov. 18, 2011

(86) PCT No.: PCT/EP2011/070500
§ 371 (c)(1),
(2), (4) Date: Apr. 21, 2014

(87) PCT Pub. No.: WO2012/072431
PCT Pub. Date: Jun. 7, 2012

(65) Prior Publication Data
US 2014/0243022 A1    Aug. 28, 2014

(30) Foreign Application Priority Data
Nov. 30, 2010 (EP) ..................... 10306323

(51) Int. Cl.
*H04W 4/00* (2009.01)
*H04W 40/34* (2009.01)
(Continued)

(52) U.S. Cl.
CPC ............... *H04W 4/02* (2013.01); *H04L 67/18* (2013.01); *H04L 67/24* (2013.01); *H04W 64/00* (2013.01); *H04W 84/045* (2013.01)

(58) Field of Classification Search
CPC ...... H04W 12/06; H04W 4/206; H04W 12/08; H04W 4/046; H04W 4/12; H04W 76/021; H04W 84/005; H04W 36/32; H04W 48/02; H04W 84/045; H04W 4/02; H04W 48/16; H04W 72/02; H04W 88/08; H04W 24/10; H04W 40/20; H04W 4/04; H04W 12/04; H04W 24/02; H04W 24/04; H04W 4/16; H04W 4/20; H04W 60/00; H04W 64/003; H04W 72/005; H04W 72/0446; H04W 76/02; H04W 64/00
(Continued)

(56) References Cited

U.S. PATENT DOCUMENTS

2003/0073440 A1*   4/2003   Mukherjee et al. .......... 455/435
2009/0036142 A1*   2/2009   Yan ...................... H04W 60/00
                                                                455/456.1
(Continued)

FOREIGN PATENT DOCUMENTS

JP     2010028322 A     2/2010
JP     2010233104 A    10/2010
(Continued)

OTHER PUBLICATIONS

"3rd Generation Partnership Project; Technical Specification Group Services and System Aspects; Presence Service; Architecture and functional description (release 9)", 3GPP Standard; 3GPP TS 23.141, (3GPP), Dec. 11, 2009, Sophia-Antipolis Cedex; France, No. V9.0.0, pp. 1-36, XP050400704, abstract, section 5, section 6.
(Continued)

*Primary Examiner* — Inder Mehra
(74) *Attorney, Agent, or Firm* — The Jansson Firm; Pehr B. Jansson

(57) ABSTRACT

The invention relates to a method for informing on the presence of a remote devices holder, said remote devices holder carrying a remote device (10,11), characterized in that it detects when the remote devices holder (1) enters under coverage of a femto-cell (2,20) or leaves the coverage of the femto-cell (2,20).

8 Claims, 1 Drawing Sheet

(51) Int. Cl.
*H04W 64/00* (2009.01)
*H04W 84/04* (2009.01)
*H04L 29/08* (2006.01)
*H04L 12/28* (2006.01)
*H04L 12/56* (2006.01)
*H04W 4/02* (2009.01)

(58) Field of Classification Search
USPC ... 455/39, 408, 411, 414.1, 418, 419, 435.1,
455/446, 450, 452.1, 452.2, 456.1, 456.2,
455/456.3, 517, 550.1, 556.1, 445,
455/435.11; 370/338, 328, 351
See application file for complete search history.

(56) References Cited

U.S. PATENT DOCUMENTS

| | | |
|---|---|---|
| 2009/0191917 A1 | 7/2009 | Zappulla et al. |
| 2010/0034179 A1* | 2/2010 | Semper ................ H04W 12/06 370/338 |
| 2010/0056184 A1* | 3/2010 | Vakil et al. ................ 455/456.5 |
| 2010/0273468 A1* | 10/2010 | Bienas et al. ................ 455/418 |
| 2010/0325269 A1 | 12/2010 | Kim et al. |
| 2011/0249658 A1* | 10/2011 | Wohlert ................ H04W 4/04 370/338 |
| 2012/0127975 A1* | 5/2012 | Yang .................... H04W 12/06 370/338 |
| 2012/0276867 A1* | 11/2012 | McNamee ......... H04L 12/1407 455/406 |

FOREIGN PATENT DOCUMENTS

| | | | |
|---|---|---|---|
| JP | 2010252273 A | 11/2010 | |
| KR | WO 2010/079957 | * 7/2010 | ............ H04W 16/32 |
| WO | WO2010059122 A2 | 2/2010 | |
| WO | WO2010079957 A2 | 7/2010 | |

OTHER PUBLICATIONS

PCT/EP2011/070500 International Search Report, Jan. 12, 2012, European Patent Office, P. B. 5818 Patentlaan 2, NL—2280 HV Rijswijk.

PCT/EP2011/070500 Written Opinion of the International Searching Authority, Jan. 12, 2012, European Patent Office, P. B. 5818 Patentlaan 2, NL—2280 HV Rijswijk.

* cited by examiner

METHOD FOR INFORMING ON THE PRESENCE OF A REMOTE DEVICE'S HOLDER

FIELD OF THE INVENTION

The present invention relates generally to location positioning and more specifically to a method for informing on the presence of a remote device's holder.

BACKGROUND OF THE INVENTION

Mobile Networks (MNOs) may propose a Location Based Service (LBS) using macro cell ID. It is an information and entertainment service, accessible with mobile devices through the mobile network which use geographical position of the mobile device. Thanks to such services, it is possible to determine a time positioning of a mobile device to connect end users to nearby points of interest, advise them of current conditions such as traffic and weather, or provide routing and tracking information via wireless devices.

Nevertheless, the use of Cell ID based triangulation is not very precise. A user is only informed with an approximated accuracy, from 3 kilometers to 200 meters accuracy.

An alternative technical solution for localization is the usage of GPS. However, all handsets are not GPS enabled, which prevents a user from using GPS services, such as tracking services, marketing services, etc. . . . There is then a need in the art for a solution which provides a precise accuracy for such services.

It is then an object of the invention to provide information on the location of a remote device's holder with a better accuracy.

Thereto, the present invention provides a method for informing on the presence of a remote device's holder, said remote device's holder carrying a remote device, characterized in that it detects when the remote device's holder enters under coverage of a femto-cell or leaves the coverage of the femto-cell.

According to other aspects of the invention,
  the method may comprise sending a message to a remote server said message comprising data able to identify said femto-cell;
  the method may comprise determining the location of said remote device's holder;
  the method may comprise sending data on the location of the remote device's holder to a predetermined list members, said predetermined list members being beforehand stored in said remote server, said location data being stored in said remote server;
  the remote server may update and may store data on the location of the remote device's holder;
  the method may comprise checking data on the location of the remote device's holder directly on a dedicated website or on a smart card web server (SCWS) connected to said remote server;
  the method may comprise sending promotional data of a second remote server to the remote device's holder;
  the method may comprise processing a profiling of said remote device's holder based on data determined by the second remote server;
  the method may comprise using a handset as remote device;
  the method may comprise using a Universal Integrated Circuit Card(UICC) as remote device;
  the method may comprise using an over-the-air server as remote server.

Thanks to the invention, it is advantageously possible to check more precisely, with better granularity than cell ID, the presence of a person such as a family member in an identified place equipped with a femto-cell.

The invention provides advantageously a targeted advertising.

BRIEF DESCRIPTION OF THE DRAWINGS

The various aspects, features and advantages of the invention will become more fully apparent to those having ordinary skill in the art upon careful consideration of the following Detailed Description, given by way of example thereof, with the accompanying drawings described below.

DETAILED DESCRIPTION

The present invention may be understood according to the detailed description provided herein.

Figure 1:
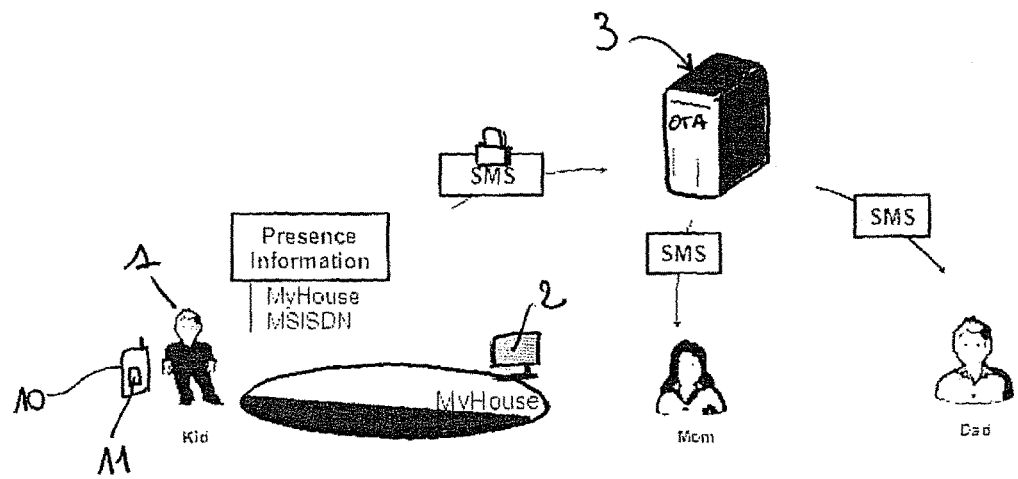
FIG. 1 schematically shows a schematic view of architecture of the invention according to a first embodiment.

Shown in FIG. 1 is a user 1 with a remote device 10 such as a handset 10. The remote device 10 comprises a UICC 11 and is adapted to be connected locally with a femto-cell 2.

A femto-cell is well known to be adapted to route the connections over a broadband internet connection back to the carrier. The femto-cell is a wireless access point that improves cellular reception where it is installed, for example inside a user home or an office building and is adapted to service up to four or five handsets concurrently. The femto-cell has typically a coverage of 10 meters.

UICC applications are informed when the handset is entering to, leaving from or camping on a femto-cell controlled by a Closed Subscriber Grou(CSG) cell selection event as defined Universal Subscriber Identity Module (USIM) application toolkit.

USIM Application Toolkit (USAT) applications can register to this CSG cell selection event. Then each time the handset is leaving, entering, or camping on a CSG cell, an event is sent to the UICC to inform it. Thanks to this event, when an end-user enters under coverage of a femto-cell, the UICC is informed by to the USIM toolkit event "CSG cell selection event". A handset call initiated in a home equipped with a femto-cell would start at the handset, be sent to the femto-cell, go from the femto-cell to the Internet through the broadband connection, transit on the Mobile Operator Core Network, and end up on the handset of the called party.

The handset 10 is a femto-cell enabled handset, implementing CSG cell USAT functions.

In a first embodiment, the user 1 or the remote device's holder 1 subscribes to a service, such as a service for providing a location information of the remote device's holder 1. For the subscription, the user 1 first creates an account on a dedicated website for example with his phone number and a password, and then enters his PIN code in his handset 10 for confirmation. An Over-The-Air (OTA) server 3 sends an SMS to activate a corresponding UICC applet.

The remote device's holder 1 also gives information on people allowed to see where he is located. For doing so, the user 1 adds a notification member list in the dedicated website comprising the phone numbers of the authorized persons. The OTA server 3 sends SMS to the concerned persons for confirmation. It will be well understood that the notification member list is configurable. At any time any member can unsubscribe to the service or the user may modify the notification member list.

When the user 1 enters under coverage of the femto-cell 2, the UICC 11 detects the event 'CSG cell selection event'. The UICC 11 sends an encrypted SMS automatically to the OTA server 3. The SMS sent by the UICC 11 comprises the Mobile Subscriber Integrated Services Digital Network Number (MSISDN) and the name of the femto-cell 2 in order to identify the femto-cell 2.

It will be well understood that the message sent can be an IP based message like SIP.

The OTA server 3 comprises a data base on the status of the user 1. When receiving such SMS, the OTA server is able to update the status of the user 1 in the data base.

The OTA server 3 sends a presence notification by SMS to the listed people. The SMS comprises the MSISDN of the user 1 and the name of the concerned femto-cell, which is in the present case the femto-cell 2. This method is advantageously real time and is automatic. When the user leaves the covered area of the femto-cell 2, the event is also detected, and an SMS is sent to the OTA server 3. The status is updated.

When there is a femto-cell in the family home, parents may then for example know if their child is at home or is not under coverage of the femto-cell.

The number of emitted SMS can be limited. A presence notification can be sent only for a predetermined time for example one SMS per hour, or only when detected by a different femto-cell, etc. . . .

In another embodiment, this sending is not automatic. The presence information can then be checked directly on a dedicated website or if available by anyone of the listed person, on a smart card web server (SCWS) embedded on the UICC of anyone of the listed persons, and connected to the OTA server 3. The SCWS on the UICC of any listed person are updated over-the-air with the status of the user 1 by the OTA server 3. If all members of a family have for example subscribed to this service, and if the family has a femto-cell at home, it is possible for one of them to check the family member presence at home. Besides, when one of the family members is not under coverage of the femto-cell, his last presence information can be checked on the dedicated website.

Such method can advantageously propose improvements and a complementary solution to MNO location services which use macro cell ID. As previously described, a cell ID based triangulation has not less than 3 kilometers accuracy in rural area, and at most 200 meters accuracy in dense urban area. The MNO location service may request the OTA server 3 more information on the user 1. When available, the MNO Location service provides precise information got from the OTA server 3 on the user 1 to the listed person.

Thanks to these embodiments, no IP address is used which may be not reliable, and no GPS is used. The remote device can be a GPS enabled in which the GPS can be deactivated or may not have any GPS. The UICC based solution can be extended to retrieve GPS information. The accuracy is improved compared to the Cell ID triangulation. Furthermore when the subscriber is under coverage but not connected to a femto-cell, the UICC is the only component that can provide the location information, since the information is not sent to core network.

In another embodiment, the user 1 subscribes to a service, such as marketing service. For the subscription, the user 1 first agrees to receive promotional messages. The user 1 may be asked to give personal information, which step can be skipped if the Mobile Network Operator (MNO) already has these information.

In order to determine the profile of the targeted users, an advertiser, such as a coffee shop 4, contacts the operator of the user 1 through a dedicated website and makes requirements such as nature of the offer, the targeted customer, etc. . . . The profile message or offer is for example "free coffee", the targeted customer is for example "everybody under coverage more than three times per week" or "everybody"

It will be well understood that the user can only subscribe for receiving messages from a specified advertiser or may receive any message from any advertiser without any profiling.

In this embodiment, the femto-cell 20 is located in one of the advertiser's selling points such as a coffee shop. When the user 1 enters under coverage of the femto-cell 20, the UICC 110 detects the event 'CSG cell selection event'. The UICC 110 sends an encrypted SMS automatically to the operator 30. The SMS sent by the UICC 110 comprises the MSISDN and the name of the femto-cell 20 in order to identify the femto-cell 20, i.e., as the femto-cell of the advertiser.

The operator 30 comprises a data base on status of the user 1. When receiving such SMS, the operator 30 is able to update the data base status of the user 1 and performs a profiling. If the user 1 meets the requirements defined by the advertiser, the operator 30 sends a marketing notification by SMS to the user 1. The marketing notification is a promotional SMS. When receiving this marketing notification, the user 1 is very close to the shop which offers the promotion and can decide to enter or not in the shop very quickly. The user does not need long time to look for the selling point as it is just near him.

Thanks to this method, it is only when a registered subscriber enters under coverage of a femto-cell and meets the requirements defined by the adviser that the operator sends the promotional message to the user. The UICC is the only component that is aware of the identity of the person who is walking nearby the shop. It allows the operator to be informed when a subscriber is under coverage of a femto-cell, and thanks to this information, the operator can send promotional messages to the subscriber based on his location.

This method is a complete end-to-end solution. It can be easily deployed by operators without any substantial modification of their current core network because it is based on mechanisms defined in 3GPP standards. It allows operators to reach every end-user as the solution works with any handset, with every femto-cell. This solution is independent from the femto-cell manufacturer, with any network.

For all these embodiments, the handset 10 and the UICC 11 implement Rel-9+ USAT functionalities. More precisely, the handset and the UICC implement the event "CSG cell selection" and provide local information command with "discovery of surrounding CSG cells", as described in the USAT specification 3GPP TS 31.111 release 9. Only the user 1 needs to upgrade his handset and his UICC. For example, members of the notification member list do not need to upgrade their handsets and can keep their own legacy handsets.

Figure 2:
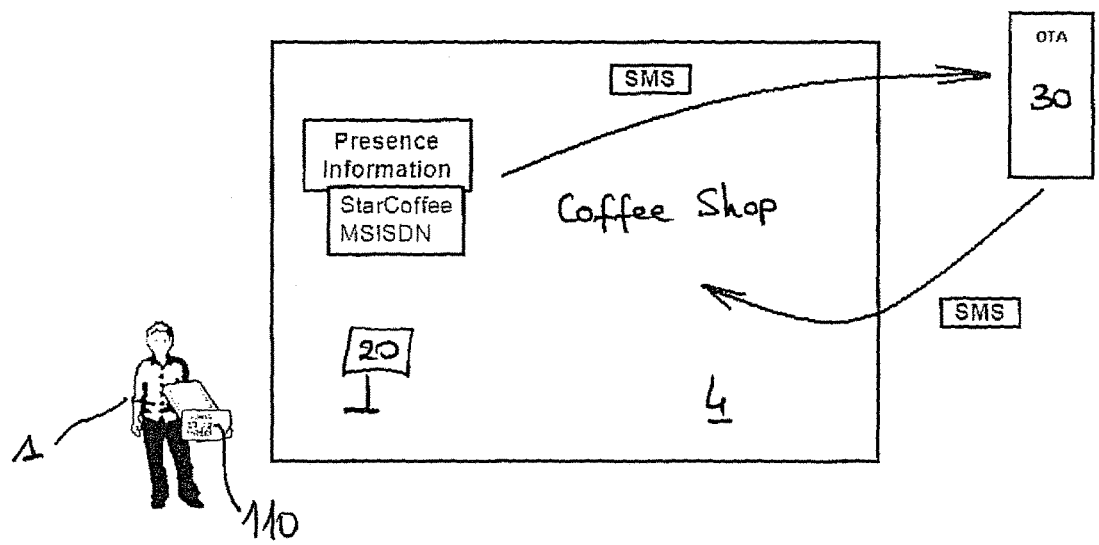
FIG. 2 schematically shows a schematic view of architecture of the invention according to a second embodiment.

According to another embodiment, as shown in FIG. 2 the femto-cell 2,20 comprises a UICC which facilitates the billing of the service. For doing so, there is a mutual authentication from the network and from the UICC of the subscriber. An EAP-AKA dialogue between the UICC and an existing HLR/AKA of the operator is created. The network authenticates the subscriber of the femto-cell 2,20 and the UICC authenticates the network. If the subscriber is allowed to use the service, the femto-cell 2,20 can then access to the operator core network.

The UICC allows the operator to integrate the charging of femto-cell services into its existing billing system without any modification. The billing is based on the IMSI which is stored within the UICC and is unique for every subscriber. Billing of this service is then realized thanks to the UICC in the femto-cell that authenticates the subscriber of the service.

The invention claimed is:

1. A method for informing as a service at least one third party on the presence of a remote device, being indicative of the presence of the holder of the remote device, at a particular location, said remote device's holder being different from the third party and carrying a remote device associated with a UICC, comprising:

registering a remote device and at least one third party with a remote server providing the service as being entitled to receive notification of location of the remote device;

detecting by the UICC of an event of the remote device's holder entering under coverage of a femto-cell or leaving the coverage of the femto-cell, wherein a femto-cell is a wireless access point providing call routing from the femto-cell to a Mobile Operator Core Network via an Internet broadband connection;

sending by the UICC a message to the remote server performing the service, said message comprising data able to identify said femto-cell;

determining by the remote server the location of said remote device based on said data able to identify said femto-cell; and sending by the remote server said location of said remote device based on said data able to identify said femto-cell from said remote server to said at least one third party registered with the remote server as entitled to receive notification of location of the remote device.

2. The method according to claim 1, wherein said at least one third party is determined by the remote server from a predetermined list members, said predetermined list members being beforehand stored in said remote server, said location data being stored in said remote server.

3. The method according to claim 1, wherein the remote server updates and stores data on the location of the remote device.

4. The method according to claim 1, wherein said sending said location of said remote device's holder to said at least one third party is in response to said at least one third party checking data on the location of the remote device directly on a dedicated website or on a card web server (SCWS) connected to said remote server.

5. The method according to claim 1 wherein said at least one third party is a server providing promotional services based on a device holder's location, further comprising sending promotional data of a second remote server to the remote device's holder.

6. The method according to claim 5, further comprising processing a profiling of said remote device's holder based on data determined by the second remote server.

7. The method according to claim 1, comprising using a handset as remote device.

8. The method according to claim 1, comprising using an over-the-air server as remote server.

* * * * *